United States Patent
Chang et al.

(10) Patent No.: US 8,154,660 B2
(45) Date of Patent: Apr. 10, 2012

(54) IMAGE DISPLAYING METHOD AND DISPLAY USING THE SAME

(75) Inventors: Chih-Ming Chang, Taoyuan County (TW); Sheng-Ke Lin, Taoyuan County (TW); Yen-Lung Lin, Taipei County (TW)

(73) Assignee: AU Optronics Corporation, Hsinchu (TW)

( * ) Notice: Subject to any disclaimer, the term of this patent is extended or adjusted under 35 U.S.C. 154(b) by 1311 days.

(21) Appl. No.: 11/772,858

(22) Filed: Jul. 3, 2007

(65) Prior Publication Data

US 2008/0122987 A1 May 29, 2008

(30) Foreign Application Priority Data

Jul. 7, 2006 (TW) .............................. 95124903 A

(51) Int. Cl.
H04N 5/46 (2006.01)
(52) U.S. Cl. ...................................... 348/555
(58) Field of Classification Search ................. 348/555, 348/552–554, 558, 705, 730, 725, 571, 575, 348/706, 569
See application file for complete search history.

(56) References Cited

U.S. PATENT DOCUMENTS

| | | | | |
|---|---|---|---|---|
| 5,754,082 A * | 5/1998 | Swanson | ........................ | 333/124 |
| 5,808,693 A * | 9/1998 | Yamashita et al. | ............ | 348/554 |
| 7,298,424 B2 * | 11/2007 | Oh | ................................ | 348/706 |
| 7,812,889 B2 * | 10/2010 | Chien et al. | ................... | 348/569 |
| 7,825,987 B2 * | 11/2010 | Yui et al. | ........................ | 348/554 |
| 2001/0043286 A1 * | 11/2001 | Hsieh et al. | .................... | 348/705 |
| 2002/0105229 A1 * | 8/2002 | Tanaka et al. | ................... | 307/29 |
| 2002/0167610 A1 | 11/2002 | Oh | | |
| 2006/0109384 A1 * | 5/2006 | Miller-Smith et al. | ........ | 348/730 |
| 2007/0126930 A1 * | 6/2007 | Jang | .............................. | 348/558 |
| 2007/0153132 A1 * | 7/2007 | Jong | .............................. | 348/705 |
| 2007/0241990 A1 * | 10/2007 | Smith et al. | ........................ | 345/5 |

FOREIGN PATENT DOCUMENTS

| | | |
|---|---|---|
| CN | 1358022 | 7/2002 |
| EP | 1 467 375 | 10/2004 |
| TW | I231686 | 4/2005 |
| TW | 200516978 | 5/2005 |
| TW | I246852 | 1/2006 |
| TW | 200608279 | 3/2006 |
| WO | WO 02/058390 | 7/2002 |

OTHER PUBLICATIONS

English abstract of CN1358022.
English language translation of abstract of TW I231686 (published Apr. 21, 2005).
English language translation of abstract of TW 200516978 (published May 16, 2005).
English language translation of abstract of TW I246852 (published Jan. 1, 2006).
English language translation of abstract of TW 200608279 (published Mar. 1, 2006).
English language translation of abstract of TW 200303513.

* cited by examiner

*Primary Examiner* — Paulos Natnael
(74) *Attorney, Agent, or Firm* — Thomas|Kayden

(57) ABSTRACT

A method of controlling a display device selectively displaying one of a first signal received from a first signal source and a second signal received from a second signal source is provided. The method includes the steps of: displaying the second signal; detecting whether the first signal is received; and displaying the first signal when the first signal is received by the display device.

10 Claims, 8 Drawing Sheets

IMAGE DISPLAYING METHOD AND DISPLAY USING THE SAME

This application claims the benefit of Taiwan application Serial No. 95124903, filed Jul. 7, 2006, the subject matter of which is incorporated herein by reference.

BACKGROUND OF THE INVENTION

1. Field of the Invention

The invention relates in general to an image displaying method and a display device using the method, and more particularly to an image displaying method and a display device using the method with the high convenience.

2. Description of the Related Art

Video entertainment has occupied an indispensable position in the life of the modern human beings, and a display device, such as a television, is an indispensable element. In general, audio and video interfaces are provided at a front end or a lateral end of the television so that the consumer can perform the easy installation. After the consumer has installed a peripheral audio-video (AV) apparatus, such as a video game machine or a DVD drive, the television and the video game machine are respectively turned on, and then an input port is selected by switching the channel. Thus, the frame of the peripheral AV signal source can be represented on the frame of the television.

FIG. 1 (Prior Art) is a state diagram showing operation mode switching of a conventional television 100. Referring to FIG. 1, the television 100 has multiple operation modes, such as an off mode 102, a standby mode 104, a TV mode 106, a first AV operation mode 111 and second to $n^{th}$ AV operation modes 112 to 11$n$. The television 100 is usually in the off mode 102, in which the television 100 is not powered on yet. After the television 100 is powered on, the television 100 is in the standby mode 104.

When the user turns on the power switch, the television has a chance to be in the TV mode 106. Then, the input port may be selected by switching the channel, and the operation mode of the television may be sequentially switched to the first AV operation mode 111 to the $n^{th}$ AV operation mode 11$n$, or from the $n^{th}$ AV operation mode 11$n$ to the TV mode 106. The first AV operation mode 111 to the $n^{th}$ AV operation mode 11$n$ respectively correspond to the different peripheral AV signal sources, such as a DVD drive or a video game machine. Either the television 100 is in the TV mode 106 or one of the first AV operation mode 111 to the $n^{th}$ AV operation mode 11$n$, the television 100 goes back to the standby mode 104 when the user turns off the power switch. The television 100 is in the off mode 102 after it is powered off.

However, the peripheral AV signal source, such as the video game machine, is frequently used at home by users, wherein most of the users are kids. The kids usually do not understand how to select the operation mode of the television, and thus need the help of the adults in selecting the correct operation mode so that the AV operation mode corresponding to the used peripheral AV signal source may be selected. Consequently, the selection of the operation mode may bring the trouble to the adults for a long time, and the convenience in use is also deteriorated.

SUMMARY OF THE INVENTION

The invention is directed to an image displaying method and a display device using the same, wherein hardware and software are combined so that an operation mode of a television is switched from a current mode to a first priority mode when the first priority mode of the television is triggered. Thus, the television displays an image corresponding to the first priority mode and the convenience in use can be enhanced.

According to a first aspect of the present invention, a television capable to be operated in a plurality of operation modes comprising a first priority mode is provided. The television is connected to a plurality of signal sources. The television includes a screen, a plurality of input ports, a detecting circuit and a processor. The input ports respectively connect to the plurality of signal sources, and one of the input ports is corresponding to the first priority mode. The detecting circuit detects whether a first signal is received at the input port corresponding to the first priority mode. When the first signal is received at the input port corresponding to the first priority mode, the television is triggered to operate in the first priority mode. The processor displays the first signal on the screen when the television is in the first priority mode.

According to a second aspect of the present invention, a method of controlling a display device selectively displaying one of a first signal received from a first signal source and a second signal received from a second signal source is provided. The method includes the steps of: displaying the second signal; detecting whether the first signal is received; and displaying the first signal when the first signal is received by the display device.

According to a third aspect of the present invention, a display device is provided. The display device includes a screen, a first input port, a second input port, a detecting circuit and a processor. The first input port receives a first signal from a first signal source. The second input port receives a second signal from a second signal source. The detecting circuit detects whether the first signal is presented at the first input port. The processor selectively controls one of the first signal and the second signal to be displayed on the screen. When the detecting circuit determines the first signal is presented at the first input port, the processor displays the first signal on the screen. When the detecting circuit determines the first signal is absent from the first input port, the processor displays the second signal on the screen.

According to a fourth aspect of the present invention, a method of controlling a display device is further provided. The display device is capable to be operated in a standby mode or a turn-on mode, receives a first signal from a first signal source. The method includes the steps of: setting the display device to operate in the standby mode; detecting whether the first signal is received; and setting the display device to operate in the turn-on mode and displaying the first signal when the first signal is received by the display device.

According to a fifth aspect of the present invention, a display device is provided. The display device includes a screen, an input port, a detecting circuit, a processor and a standby power circuit. The input port receives a first signal from a first signal source. The detecting circuit detects whether the first signal is presented at the input port. The processor selectively controls the display device to be operated in one of a standby mode and a turn-on mode. The processor controls the display device to be operated in the turn-on mode and displays the first signal on the screen when the detecting circuit determines that the first signal is presented at the input port. The processor controls the display device to be operated in the standby mode when the detecting circuit determines the first signal is absent at the input port.

The invention will become apparent from the following detailed description of the preferred but non-limiting embodiments. The following description is made with reference to the accompanying drawings.

DETAILED DESCRIPTION OF THE INVENTION

The invention provides an image displaying method and a display device using the same, wherein hardware and software are combined so that an operation mode of a television is switched from a current mode to a first priority mode when the first priority mode of the television is triggered. Thus, the television displays an image corresponding to the first priority mode and the convenience in use can be enhanced.

Figure 1:
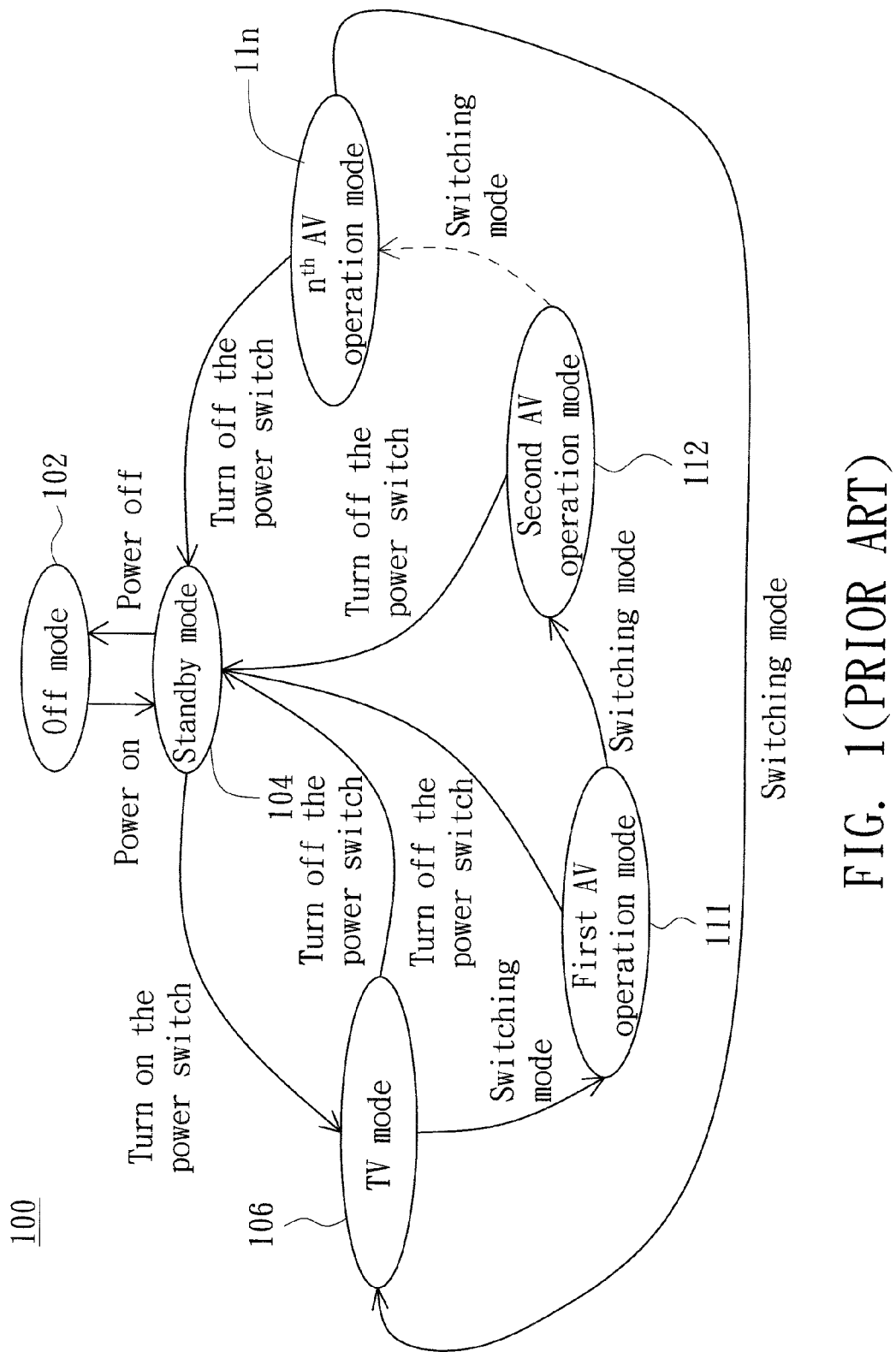
FIG. 1 (Prior Art) is a state diagram showing operation mode switching of a conventional television.
Figure 2:
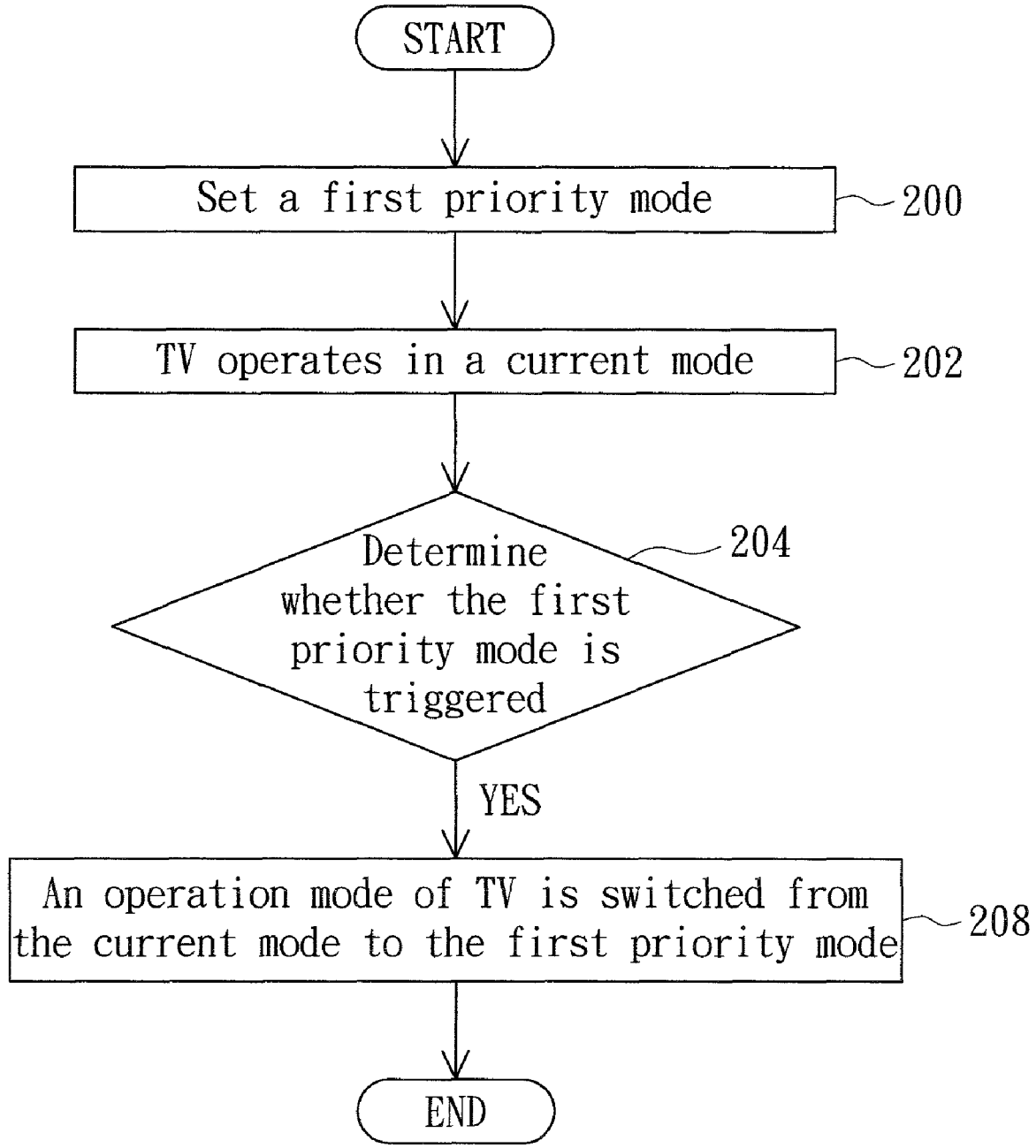
FIG. 2 is a flow chart showing an image displaying method applied to a television according to a preferred embodiment of the invention.

FIG. 2 is a flow chart showing an image displaying method applied to a television according to a preferred embodiment of the invention. As shown in FIG. 2, the television usually has many operation modes including, for example, an off mode, a standby mode and a turn-on mode. The turn-on mode includes, for example, a TV mode, a game mode or many audio-video (AV) operation modes.

First, in step 200, the user sets one of the operation modes as a first priority mode. Of course, this first priority mode may also be set as one of the operation modes when the television is shipped out. Then, in step 202, the television operates in a current mode, which is one of the operation modes. Next, in step 204, the television has a chance to determine whether the first priority mode is triggered. For example, when the television receives a video signal corresponding to the first priority mode, the television has a chance to determine whether the first priority mode is triggered. If the first priority mode is triggered, the operation mode of the television is switched from the current mode to the first priority mode in step 208 so that the television displays an image corresponding to the first priority mode.

Figure 3:
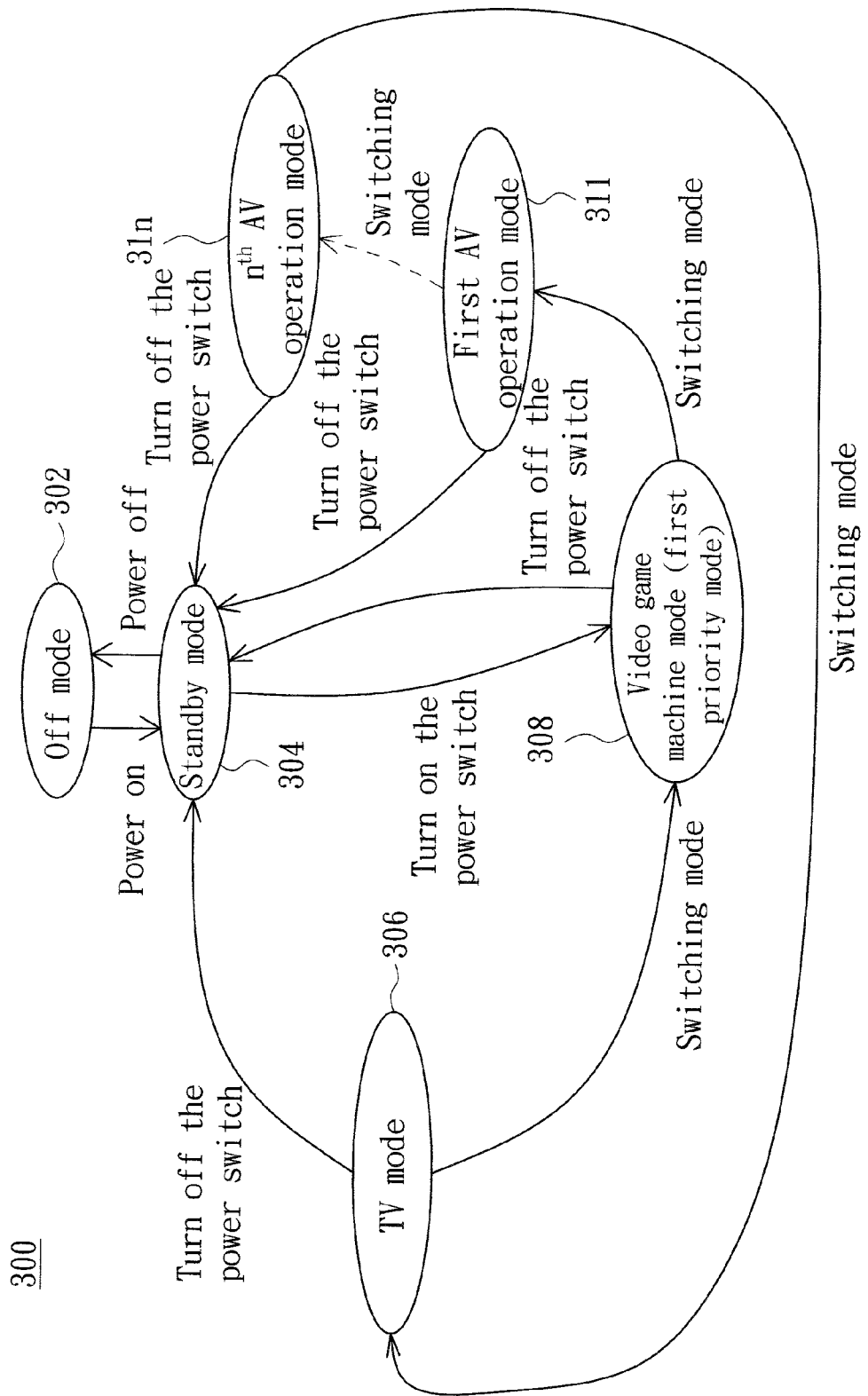
FIG. 3 is a state diagram showing operation mode switching of the television according to the preferred embodiment of the invention.

FIG. 3 is a state diagram showing operation mode switching of a television 300 according to the preferred embodiment of the invention. As shown in FIG. 3, the television 300 individually receives a television signal from a television signal source, receives a video signal, which is outputted after a video game machine is turned on, from the video game machine, and receives many video signals from the AV signal sources. The television 300 has an off mode 302, a standby mode 304, a TV mode 306, a game mode 308 and many AV operation modes 31x (x=1 to n). The television 300 displays the television signal, the video signal outputted after the video game machine is turned on and the video signals in the TV mode 306, the game mode 308 and the AV operation modes, respectively. In this illustrated embodiment, the game mode 308 is set as the first priority mode. When the television 300 is not connected to an external power, such as the mains, the television 300 is in the off mode 302. When the television 300 is connected to the external power and the video signal outputted from the video game machine does not exist, the television 300 is in the standby mode 304. After the user turns on the power switch, the television 300 enters the turn-on mode, and the television 300 may be set, in advance, as directly entering the first priority mode (e.g., the game mode 308) or staying in the last mode before the user shuts down the television 300.

If the television 300 receives the video signal of the first priority mode, which is outputted after the video game machine is turned on, that is, when the television 300 determines that the video signal outputted after the video game machine is turned on exists, the television 300 determines that the first priority mode is triggered. No matter which one of the standby mode 304, the TV mode 306 and the AV operation modes 31x (x=1 to n) is entered by the television 300, the television 300 immediately switches to the game mode 308 so as to display the image corresponding to the video signal outputted from the video game machine after the video game machine is turned on without requesting the user to operate the television 300 again. Thus, the user can start to operate the video game machine and view the operation result on the television 300.

When the user wants to switch the operation mode to another mode, he or she can switch the operation mode of the television 300 to one of the AV operation modes 31x (x=1 to n), to the standby mode 304, to the TV mode 306 and then back to the game mode 308 sequentially by switching the channel. In addition, when the video game machine is powered off, the television 300 determines whether the video signal, which is outputted after the video game machine boots, is absent and then goes back to the previous current mode, such as the standby mode 304, the TV mode 306, or one of the AV operation modes 31x (x=1 to n).

Figure 4A:
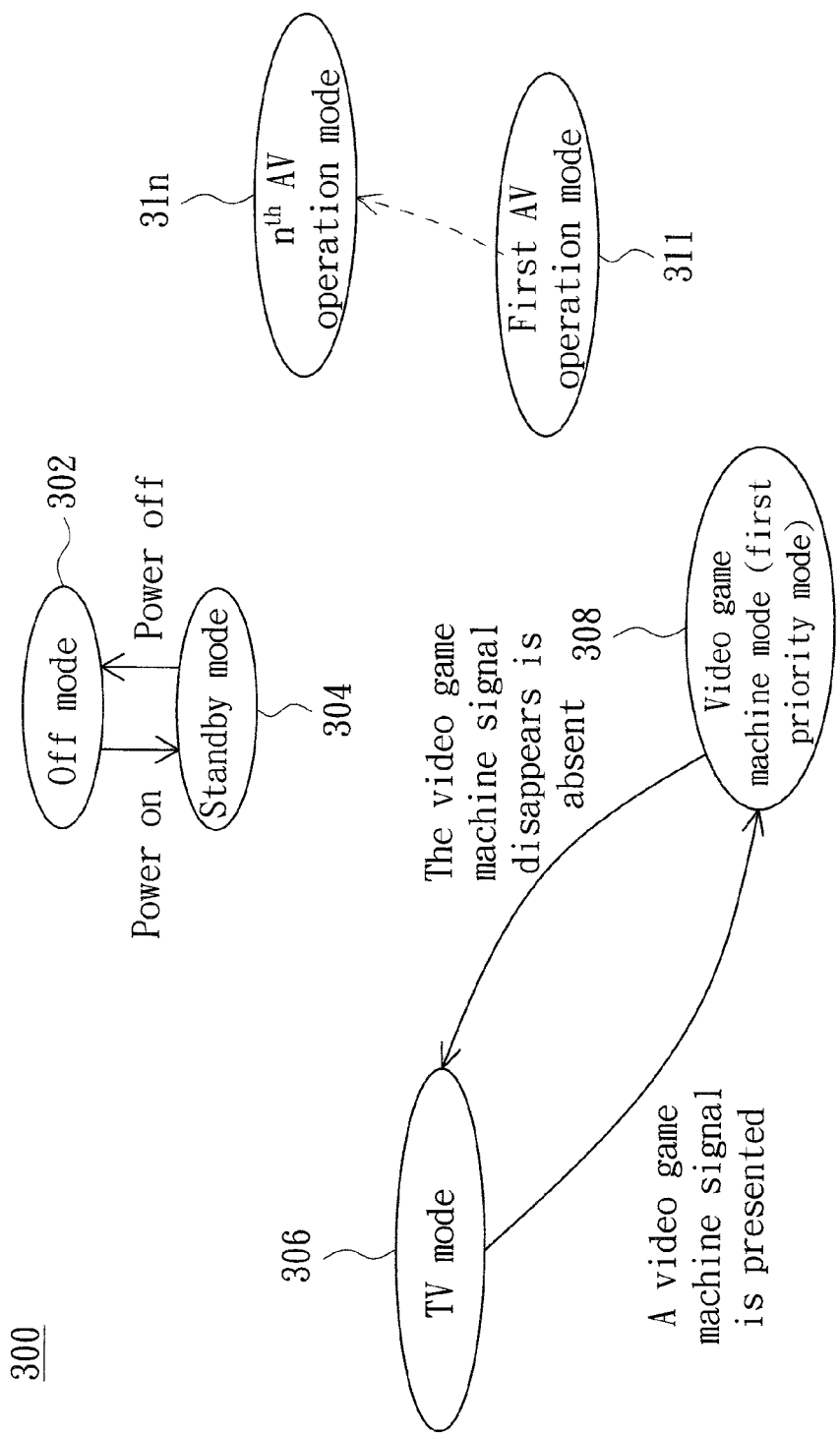
FIG. 4A is a state diagram showing an example of the operation mode switching of the television according to the preferred embodiment of the invention.

Three examples for mode switching will be illustrated in detailed in the following. FIG. 4A is a state diagram showing an example of the operation mode switching of the television according to the preferred embodiment of the invention. As shown in FIG. 4A, when the television 300 is set as the TV mode and receives the television signal from the television signal source, the user may watch the television program. At this time, if the television 300 determines that the video signal outputted after the video game machine is turned on exists, the first priority mode is triggered and the television 300 automatically switches to the game mode 308 so as to display the video signal after the video game machine is turned on without the channel selecting operation being made by the user. When the television 300 determines that the video signal after the video game machine is turned on is absent, the television 300 goes back to the TV mode 306 and displays the image corresponding to the television signal.

Figure 4B:
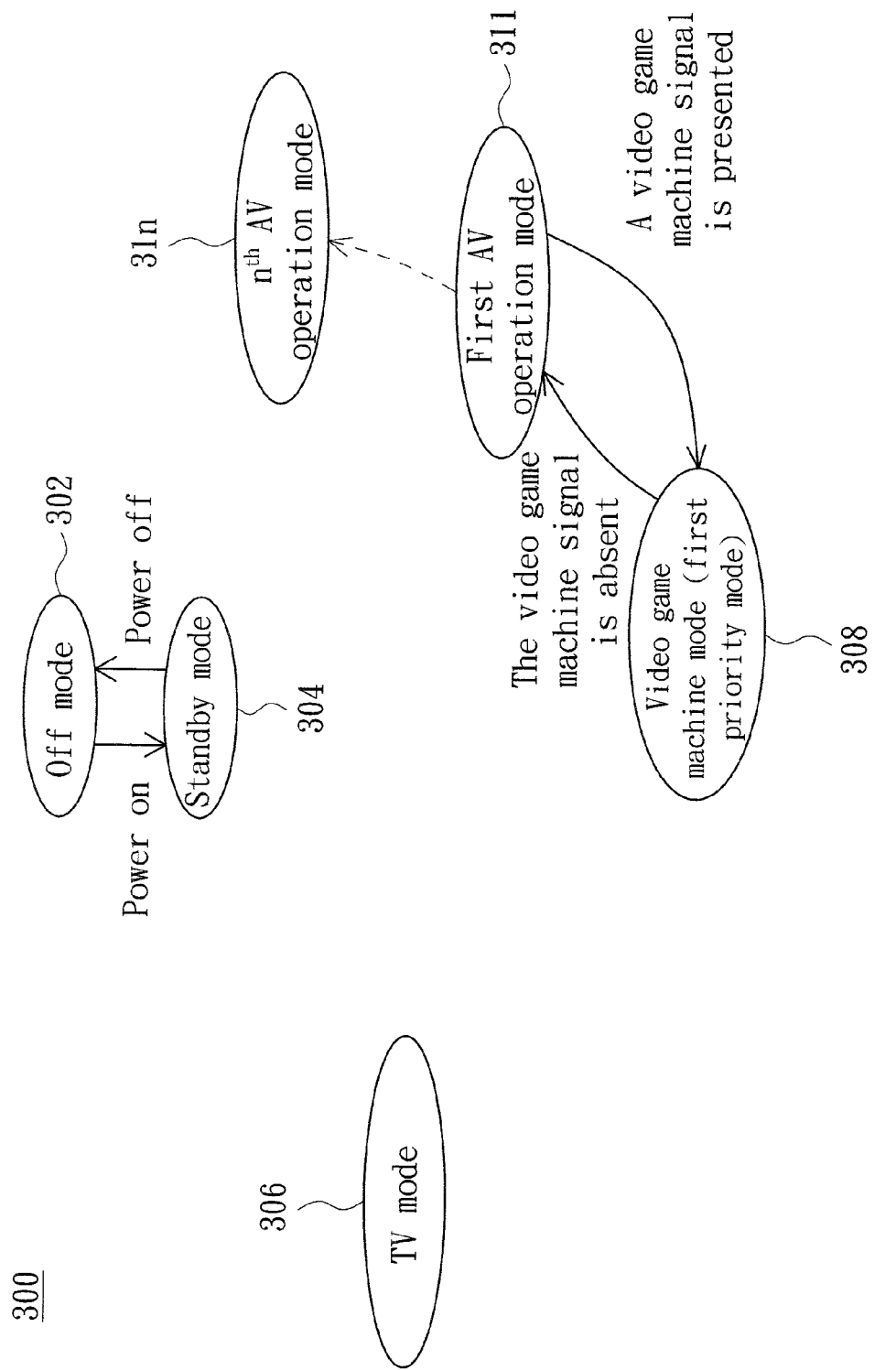
FIG. 4B is a state diagram showing another example of the operation mode switching of the television according to the preferred embodiment of the invention.

FIG. 4B is a state diagram showing another example of the operation mode switching of the television according to the preferred embodiment of the invention. As shown in FIG. 4B, when the television 300 is set as the first AV operation mode and receives the video signal from the audio-video (AV) signal source, the user may watch a film played by the first AV signal source, such as the film outputted from a VCD player or a DVD player. At this time, if the television 300 determines that the video signal outputted after the video game machine is turned on exists, the first priority mode is triggered and the television 300 automatically switches to the game mode 308 so as to display the video signal outputted after the video game machine is turned on without the channel selecting operation being made by the user. When the television 300 determines that the video signal outputted after the video game machine is turned on is absent, the television 300 goes back to the first AV operation mode 311 and displays the video signal.

Figure 4C:
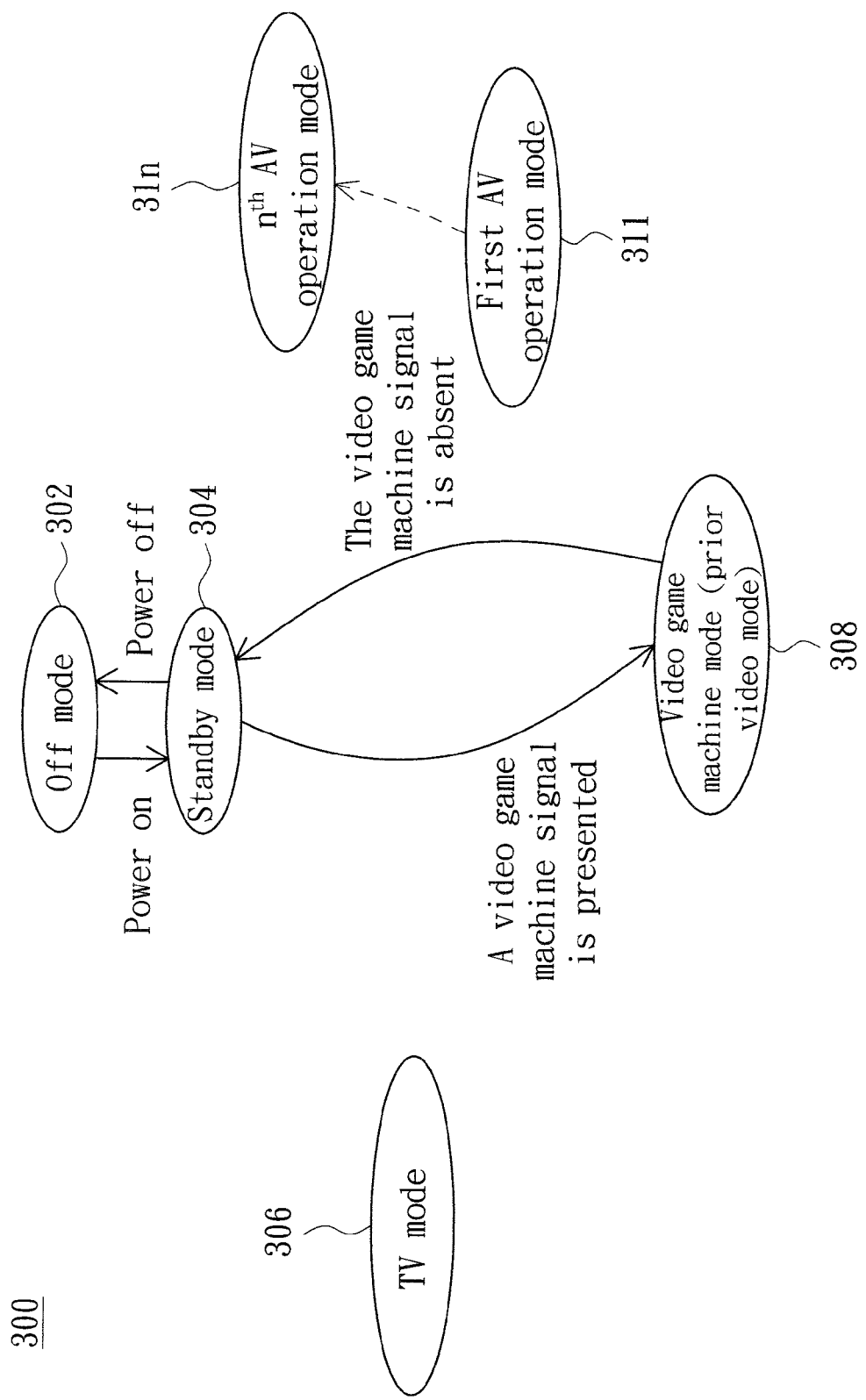
FIG. 4C is a state diagram showing still another example of the operation mode switching of the television according to the preferred embodiment of the invention.

FIG. 4C is a state diagram showing still another example of the operation mode switching of the television according to the preferred embodiment of the invention. As shown in FIG. 4C, when the television 300 is set as the standby mode 304 and the television 300 determines that the video signal outputted after the video game machine is turned on exists, the first priority mode is triggered and the television 300 automatically operates in the turn-on mode so as to display the video signal outputted after the video game machine is turned on without the channel selecting operation being made by the user. When the television 300 determines that the video signal outputted after the video game machine is turned on is absent, the television 300 goes back to the standby mode 304.

In the above-mentioned embodiment, the first priority mode is illustrated by taking the game mode 308 as a non-restrictive example, and any other mode may also be set as the first priority mode.

Figure 5:
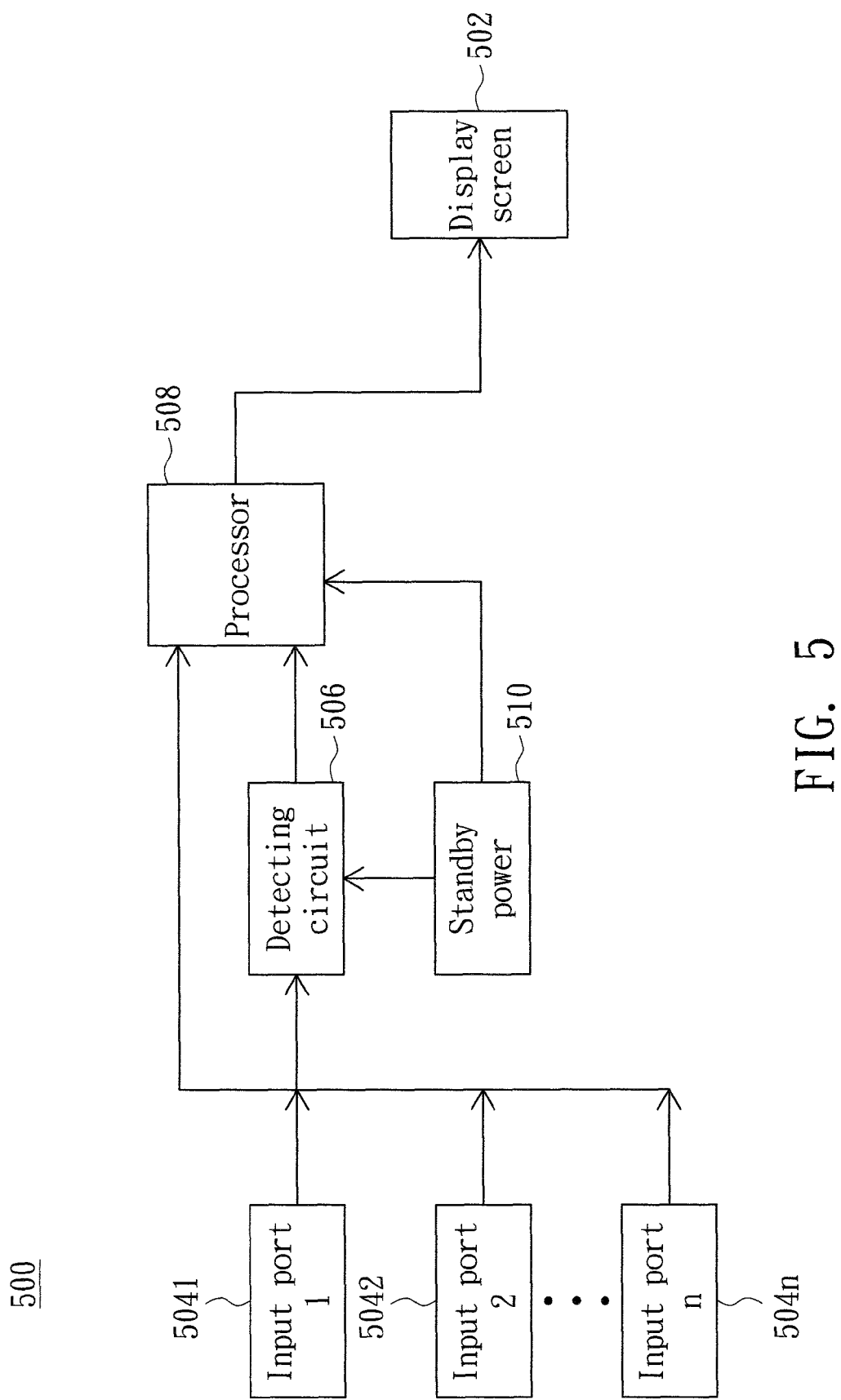
FIG. 5 is a block diagram showing the television having a first priority mode according to the preferred embodiment of the invention.

FIG. 5 is a block diagram showing a television 500 having a first priority mode according to the preferred embodiment of the invention. Referring to FIG. 5, the television 500 includes a display screen 502, input ports 504$x$ (x=1 to n), a detecting circuit 506 and a processor 508. The input ports 504$x$ (x=1 to n) respectively receive the video signals, which are respectively outputted from the AV signal sources corresponding to these operation modes. For example, the input ports 504$x$ (x=1 to n) respectively receive the video signal outputted after the video game machine is turned on from the video game machine, receive the television signal from the television signal source or receive the corresponding video signals from the AV signal sources.

The detecting circuit 506 detects whether the AV signal source corresponding to the first priority mode outputs the video signal. When the television 500 receives the video signal corresponding to the first priority mode, the detecting circuit 506 determines that the video signal corresponding to the first priority mode exists, and the first priority mode of the television 500 is triggered. The processor 508 can selectively control one of the video signal, the television signal and the video signal outputted after the video game machine is turned on to be displayed on the display screen. When the first priority mode is triggered, the processor 508 outputs the video signal corresponding to the first priority mode to the display screen 502. When the television 500 cannot receive the video signal corresponding to the first priority mode any longer, the detecting circuit 506 determines that the video signal corresponding to the first priority mode is absent, and the processor 508 outputs the video signal corresponding to the current mode to the display screen 502. The television 500 further includes a standby power circuit 510 for supplying a standby power to the detecting circuit 506 and the processor 508 when the television 500 is in the standby mode.

Figure 6:
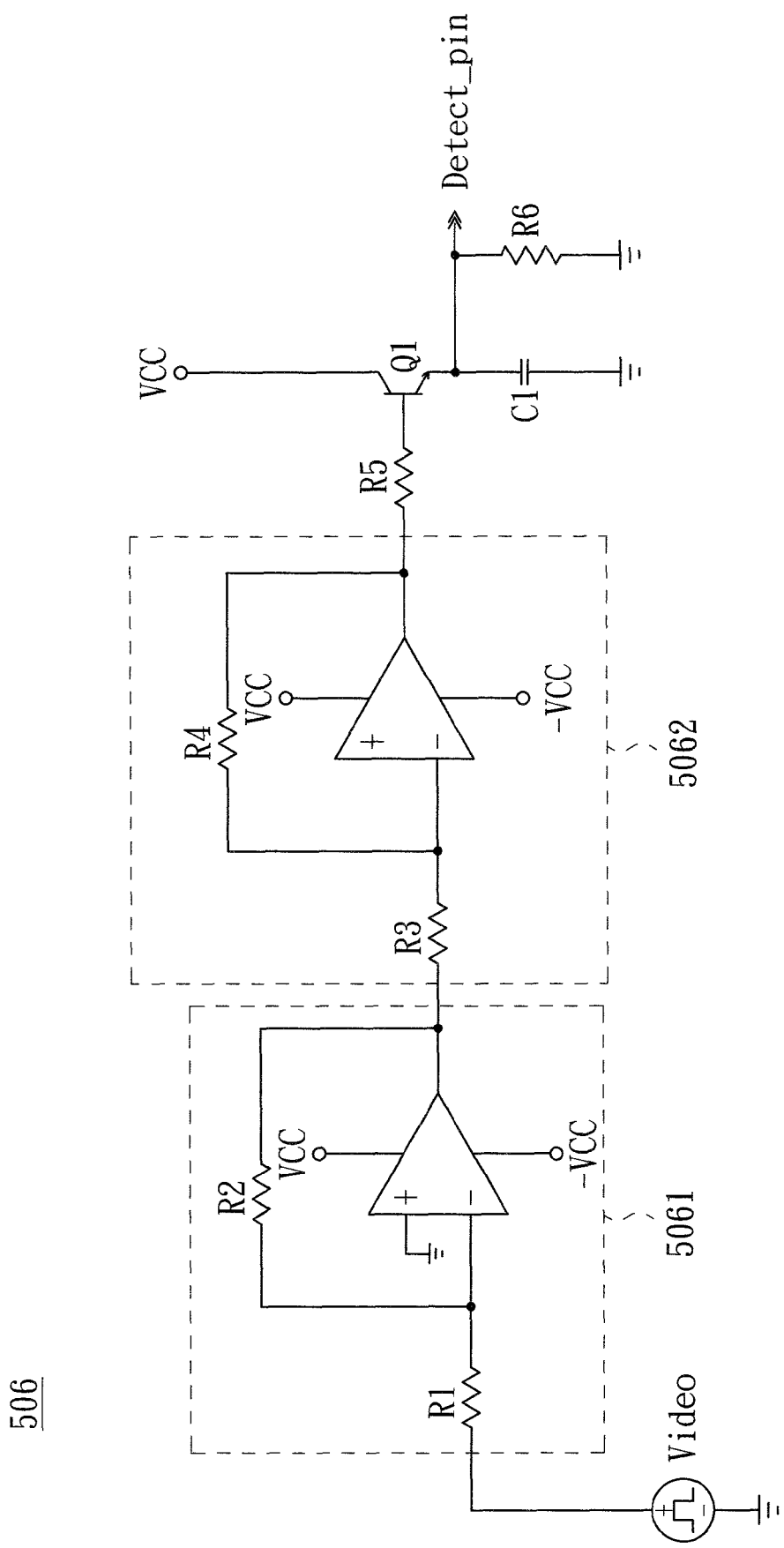
FIG. 6 is a circuit diagram showing an example of a detecting circuit 506 according to the preferred embodiment of the invention.

FIG. 6 is a circuit diagram showing an example of the detecting circuit 506 according to the preferred embodiment of the invention. As shown in FIG. 6, when the television 500 receives the video signal Video corresponding to the first priority mode, a transistor Q1 turns on through the cooperation of a first inverting amplifier 5061 and a second inverting amplifier 5062. After a predetermined period of time, a capacitor C1 is boosted to a fixed voltage so that the transistor Q1 outputs a high-level processor waking signal Detect_pin to trigger the processor 508 and make the processor 508 output the video signal corresponding to the first priority mode to the display screen 502 so that the video signal can be displayed on the frame of the television 500 preferentially.

The embodiment of the invention is illustrated by taking the television as an example, and may also be applied to other displays without restricting the scope of the television.

In the image displaying method and the display using the same according to the invention, the hardware and software are combined so that the operation mode of the television is switched from the current mode to the first priority mode when the first priority mode of the television is triggered. Thus, the television displays the image corresponding to the first priority mode and the convenience in use can be enhanced. In addition, the user needs not to perform any complicated switching operation on the television and the operation mode can be switched to the first priority mode quickly. Thus, the object of enhancing the convenience in use may be achieved in this invention.

More particularly, when the user is a kid who wants to use the video game machine, the kid can start to use the video game machine by only inserting the connector of the video game machine into the television without any switching operation. Thus, the adult does not have to assist the kid in performing the complicated switching operation and the kid can start to use the video game machine easily. Meanwhile, it is also possible to prevent the kid from damaging the television when the kids incorrectly operate the television.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A television capable to be operated in a plurality of operation modes comprising a first priority mode, the television connected to a plurality of signal sources, the television comprising:

a screen;

a plurality of input ports for respectively connecting to the plurality of signal sources, one of the input ports being corresponding to the first priority mode;

a detecting circuit for detecting whether a first signal is received at an input port, and detecting whether the input port at which the first signal is received is corresponding to the first priority mode, wherein when the first signal is received at the input port corresponding to the first priority mode, the television is triggered to operate in the first priority mode; and a processor for displaying the first signal on the screen when the television is in the first priority mode;

wherein when the first priority mode of the television is not triggered, and the television is in one of the other operation modes, the processor displays a second signal corresponding to one of the other operation modes on the screen.

2. The television according to claim 1, wherein the first priority mode is the game mode for receiving the first signal from a game machine.

3. The television according to claim 1, wherein the operation modes further comprise a standby mode, and the television further comprises a standby power circuit for supplying a standby power to the detecting circuit and the processor when the television is in the standby mode.

4. A method of controlling a display device selectively displaying one of a first signal received from a first signal source and a second signal received from a second signal source, the method comprising the steps of:

displaying the second signal when the display device is operated in a current mode of the display device;

detecting whether the first signal is received at an input port of the display device, and detecting whether the input port is corresponding to a first priority mode of the display device; and displaying the first signal when the first signal is received at the input port corresponding to the first priority mode by the display device;

wherein the display device is capable to be operated in the first priority mode, a television (TV) mode or an audio-video (AV) mode, the display device receives a television signal from a television signal source, and receives an video signal from an audio-video (AV) signal source, the display device displays the television signal when the display device is operated in the TV mode, the display device displays the video signal when the display device is operated in the AV operation mode, the display device detects whether the first signal is received by the display device; and the display device is triggered to be operated in the first priority mode and displays the first signal when the first signal is received by the display device.

5. The method according to claim 4, further comprising the steps of:

continuously displaying the second signal when the first signal is not received by the display device.

6. The method according to claim 5, wherein the first signal source is a video game machine, the first signal is a video signal after the video game machine is turned on, the second signal source is the television signal source, and the second signal is the television signal.

7. A display device, comprising:

a screen;

a first input port for receiving a first signal from a first signal source;

a second input port for receiving a second signal from a second signal source;

a detecting circuit for detecting whether the first signal is presented at the first input port, and detecting whether the first input port is corresponding to a first priority mode of the display device; and a processor for selectively controlling one of the first signal and the second signal to be displayed on the screen;

wherein when the detecting circuit determines the first signal is presented at the first input port and determines the first input port is corresponding to the first priority mode of the display device, the processor displays the first signal on the screen; and when the detecting circuit determines the first signal is absent from the first input port or determines the first input port is not corresponding to the first priority mode of the display device, the processor displays the second signal on the screen.

8. The display device according to claim 7, wherein the first signal source is a video game machine, the first signal is received after the video game machine is turned on.

9. The display device according to claim 8, wherein the second signal source is an audio-video (AV) equipment, the second signal comprising an audio-video signal, and the processor displays the audio-video signal on the screen when the video game machine is off.

10. The display device according to claim 7, wherein the input ports receive a television signal from a television signal source, and receive a video signal from an audio-video (AV) signal source, the processor displays the television signal on the screen when the display device is set in a TV mode and the detecting circuit determines the first signal is not received, and the processor displays the video signal on the screen when the display device is set in an AV operation mode and the detecting circuit determines the first signal is not received.

* * * * *